Feb. 8, 1966

T. A. BYLES 3,233,827

ELECTRONIC DEVICE

Filed Dec. 16, 1963

INVENTOR.
Theodore A Byles
BY Mueller and Aichele
Attys.

United States Patent Office 3,233,827
Patented Feb. 8, 1966

3,233,827
ELECTRONIC DEVICE
Theodore A. Byles, Villa Park, Ill., assignor to Motorola, Inc., Franklin Park, Ill., a corporation of Illinois
Filed Dec. 16, 1963, Ser. No. 330,866
4 Claims. (Cl. 235—95)

This invention relates to odometers for use in vehicles for indicating the distance travelled, and more particularly to an electronically controlled odometer.

Many odometers are operated mechanically by using long flexible cables interconnecting the transmission or other power takeoff point with the indicator mechanism of the odometer. These flexible cables are used to transmit the mechanical movement derived from the transmission or other power takeoff point to drive the indicator mechanism. Such cables have the disadvantage that they are unreliable, being subject to breakage or noisy operation. Heretofore, odometers designed to dispense with the need for mechanical drive cables have been unduly complex and expensive.

Accordingly, it is an object of this invention to provide an improved and reliable odometer which is simple and economically constructed.

Another object of the invention is to provide an electronic odometer dispensing with the need for any mechanical cable interconnection.

A feature of the invention is the provision, in an odometer for use in a vehicle, of a semiconductor switch and a magnetic pulse generator operable in synchronism with the mechanical drive for the vehicle for triggering the semiconductor switch to actuate an indicator.

Still another feature of the invention is the provision of a magnetic pulse generator including a magnetic circuit with a resilient armature portion and a cam drive which rotates in synchronism with the vehicle travel to displace the armature portion and then allow it to snap back into place and close the magnetic circuit to generate a pulse. The pulse is applied to a transistor controlled indicator.

Figure 4:
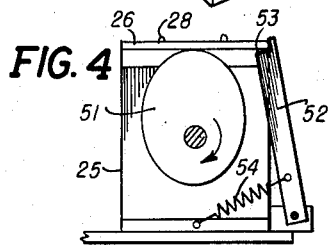
Figure 5:
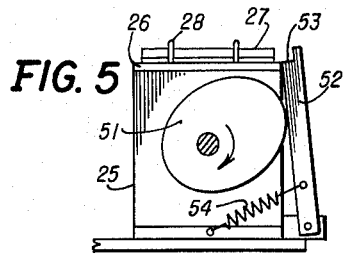
Figure 6:
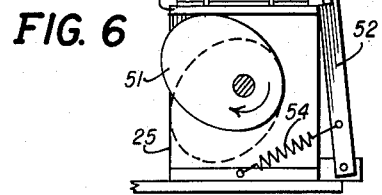
Figure 7:
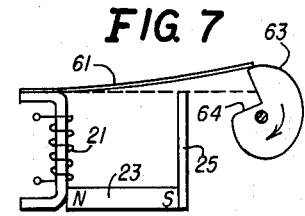

FIGS. 4, 5, and 6 are a plurality of end views depicting the operation of an alternative construction of the invention; and FIG. 7 is a side elevational view of another alternative construction of the invention.

In accordance with the invention, an odometer for use in a vehicle is provided with an indicator responsive to electric triggering pulses applied thereto to visibly register in given increments the distance travelled by the vehicle. A semiconductor switch, such as a transistor, is connected to the indicator to apply triggering pulses thereto such that the indicator will change upon the travelling by the vehicle of a given increment of distance. A magnetic pulse generator is connected to the semiconductor switch and is operable in synchronism with the mechanical drive of the vehicle to apply control pulses to the transistor at intervals corresponding to the given increments of distance registerable by the indicator.

The magnetic pulser may be of several forms. In one form, the pulser includes a magnetic circuit which has a movable armature portion for varying the flux therethrough. A coil is placed about a portion of the magnetic circuit to generate a pulse and apply this pulse towards controlling the semiconductor switch. The pulse is produced when the flux in the magnetic circuit changes rapidly due to a stepped cam which slowly opens the armature portion and then permits the same to snap back into a closed position. An alternative construction of the magnetic pulser includes a smooth surfaced cam (as opposed to a stepped cam) together with a latch mechanism. The armature portion of the magnetic circuit is separated by the cam and latched, and the latch is released by further movement of the cam, causing the armature portion to snap back to a closed position. Still another form of the invention includes a magnetic pulse generator wherein the armature portion is comprised of a leaf spring displaceable by a stepped cam.

Figure 1:
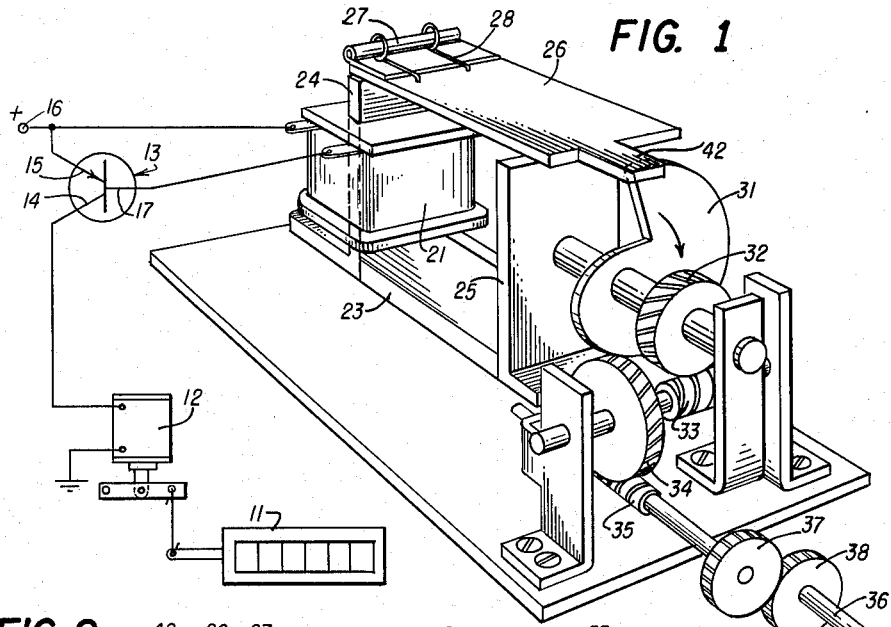
FIG. 1 is a partially perspective and partially schematic view of an odometer constructed in accordance with the invention.

Referring now to FIG. 1, the indicator shown includes a visible register 11 which may be operated through a ratchet advance mechanically driven by a solenoid 12 placed adjacent thereto. Triggering pulses applied to solenoid 12 will trip the ratchet advance and cause indicator 11 to step one increment. Such devices are generally known in the art.

Solenoid 12 is triggered by a transistor 13. Transistor 13 includes a collector portion 14 connected to solenoid 12, an emitter portion 15 connected to a terminal 16 providing a positive potential (which may be the storage battery of the automobile) and a base portion 17. The base portion 17 is also connected to the terminal 16 by an inductance coil 21 so that transistor 13 is held normally nonconducting by the source of positive potential.

A magnetic pulser is provided for applying a potential across base and emitter of transistor 13 to render the transistor conducting for triggering solenoid 12. This magnetic pulser includes a permanent magnet 23 and a magnetic circuit formed of plates 24, 25 and 26, all of magnetic material. The inductance coil 21 is positioned about plate 24. According to well known principles, a rapid change of flux in plate 24 and through coil 21 will induce a voltage in the coil, and this voltage, when applied between the base and emitter electrodes of transistor 13 will bias transistor 13 into conduction.

Plate 26 is connected to plate 24 by means of a hinge 27 and is biased by spring 28 to be normally held against the upper edge of plate 25. A cam 31 is used for displacing plate 26 so that the magnetic circuit through coil 21 is gradually separated. Cam 21 is driven through a gear reduction train comprised of gear 32, worm 33, gear 34, and worm 35. Worm 35 may be driven from the output shaft 36 of the transmission or some other appropriate part of the mechanical drive system of the vehicle through gears 37 and 38. This power take-off point should correspond as closely as possible to the travel of the vehicle, and a satisfactory point would be in the drive system beyond the output of the transmission. This would then correspond to wheel rotation. The gears will therefore, operate according to the distance of travel of the vehicle in which the odometer is used. A gear reduction ratio is used in the described gear train so that cam 31 will rotate once every 1/10 of a mile. For example, if the worm 35 were driven from the transmission at 1000 revolutions per mile, the two stage worm reducer would be constructed for a 100 to 1 reduction.

Figure 2:
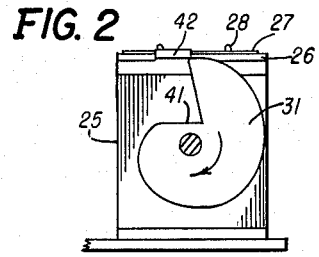
FIGS. 2 and 3 are a pair of end views of a portion of the odometer shown in FIG. 1, which depicts the sequence of operation.
Figure 3:
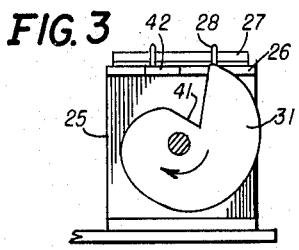

Referring to FIGS. 2 and 3 it will be seen that as cam 31 rotates in the direction of the arrow, plate 26 is displaced upwardly against the bias of spring 28 raising the plate 26 from the plate 25 and slowly reducing the flux therethrough. Cam 31, however, is formed with a step 41 therein and as the step 41 clears the cam follower projection 42 of plate 26, the plate will snap back against plate 25 acting as an armature to cause a rapid change in flux through coil 21. FIG. 2 shows the cam position just before the armature is released, and FIG. 3 shows the armature against the plate 25. Coil 21 will develop a pulse to place a negative bias on base 17 of transistor 13 with respect to emitter 15, causing transistor 13 to conduct a larger pulse to solenoid 12 for actuating the same. Accordingly, every 1/10 of a mile, solenoid 12 will be actuated to trigger the register 11 to step the necessary distance. A clutch (not shown) could be used to disengage the transmission from the mechanism when the vehicle is operated in reverse.

It should be emphasized that the indicator is actuated by electronically pulsing a solenoid and not mechanically. This means that the magnetic pulser may be located adjacent the transmission where a short straight shaft may be used to drive worm 35, as opposed to the unreliable flexible drive cables used in mechanical systems. Transistor 13 may be located either adjacent to the magnetic pulser or adjacent to the indicator unit including solenoid 12 in the dash panel of the vehicle. In either case the only connector needed is an electrical one, providing higher reliability and noiseless operation.

Referring now to FIGS. 4, 5, and 6, an alternative construction for the magnetic pulse generator may be seen. Here a smooth surfaced cam 51 is used in connection with a latch 52. Latch 52 has a step 53 formed therein and is biased inwardly toward cam 51 by a spring 54. As cam 51 rotates in the direction of the arrow, the latch is displaced outwardly as shown in the middle figure. This permits plate 26 to snap downwardly, closing the magnetic circuit quickly to generate the pulse. Further rotation of cam 51 displaces plate 26 upwardly until the step 53 in latch 52 slips underneath plate 26 to hold it in the separated position until the latch 52 is displaced once again. This design permits reverse operation of vehicle and rotation of the cam opposite the arrow and still indicates total distance travelled regardless of direction.

Referring now to FIG. 7 still another alternative construction of the invention is shown. Here plate 26 is replaced by a resilient leaf spring 61. Leaf spring 61 is displaced by a cam 63 having a step 64 therein, and flexes to separate and snap back against plate 25 as shown in phantom. The construction of FIG. 7 does not require separate hinge and spring. Of course, other types of magnetic pulsers could be utilized within the teachings and scope of this invention.

It may therefore, be seen that the invention provides an improved and reliable electronic odometer which is simple and inexpensive of construction.

I claim:
1. A counter for use in indicating the revolutions of a rotating member in a mechanical drive system, including in combination, indicator means responsive to electric triggering pulses applied thereto to visibly register in given increments the revolutions of the rotating member, a transistor responsive to control pulses applied thereto to apply triggering pulses to said indicator means, a magnetic circuit including a resilient armature portion, cam means engaging said armature portion and operable in synchronism with the rotating member of the mechanical drive system to slowly displace said armature portion against the resilience thereof and to release the same for rapid movement, and an inductance coil disposed about a portion of said magnetic circuit and responsive to rapid movement of said armature portion to apply triggering pulses to said transistor at intervals corresponding to the given increments of revolutions registrable by said indicator means.

2. The combination of claim 1 wherein said armature portion comprises a resilient plate and wherein said cam means comprises a cam having a step therein to permit said resilient plate to snap to a closed position.

3. The combination of claim 1 wherein said armature portion includes a resilient plate and wherein said cam means includes an eccentric and a latch engageable thereby to release said plate.

4. The combination of claim 1 wherein said armature portion comprises a leaf spring and wherein said cam means comprises a cam having a step therein for permitting said leaf spring to snap back to a closed position after displacement thereof by said cam means.

References Cited by the Examiner
UNITED STATES PATENTS

| | | | |
|---|---|---|---|
| 2,243,738 | 5/1941 | Mather | 74—160 |
| 2,491,902 | 12/1949 | Ostline | 179—90 |
| 2,584,990 | 2/1952 | Dimond | 307—88.5 |
| 2,665,845 | 1/1954 | Trent | 235—92 |

LEYLAND M. MARTIN, *Primary Examiner.*

LEO SMILOW, *Examiner.*